United States Patent
Chao et al.

(10) Patent No.: US 12,418,022 B2
(45) Date of Patent: Sep. 16, 2025

(54) NEGATIVE ELECTRODE MATERIAL FOR A LITHIUM ION BATTERY

(71) Applicant: UEA Enterprises Limited, Norwich (GB)

(72) Inventors: Yimin Chao, Norwich (GB); Chenghao Yue, Norwich (GB)

(73) Assignee: UEA Enterprises Limited, Norwich (GB)

( * ) Notice: Subject to any disclaimer, the term of this patent is extended or adjusted under 35 U.S.C. 154(b) by 633 days.

(21) Appl. No.: 17/633,136

(22) PCT Filed: Jul. 31, 2020

(86) PCT No.: PCT/GB2020/051838
§ 371 (c)(1),
(2) Date: Feb. 4, 2022

(87) PCT Pub. No.: WO2021/023974
PCT Pub. Date: Feb. 11, 2021

(65) Prior Publication Data
US 2022/0336794 A1    Oct. 20, 2022

(30) Foreign Application Priority Data
Aug. 5, 2019  (GB) ...................... 1911174

(51) Int. Cl.
*H01M 4/36*  (2006.01)
*C01B 33/02*  (2006.01)
(Continued)

(52) U.S. Cl.
CPC ............. *H01M 4/366* (2013.01); *C01B 33/02* (2013.01); *H01M 4/386* (2013.01); *H01M 4/483* (2013.01);
(Continued)

(58) Field of Classification Search
CPC ...... H01M 4/366; H01M 4/386; H01M 4/483; H01M 4/587; H01M 4/622; H01M 4/625;
(Continued)

(56) References Cited

U.S. PATENT DOCUMENTS

2017/0155105 A1* 6/2017 Kim ................... H01M 50/171
2017/0352881 A1* 12/2017 Minami ................ H01M 4/131
(Continued)

FOREIGN PATENT DOCUMENTS

| CN | 103904306 A | 7/2014 |
|---|---|---|
| CN | 105406041 A | 3/2016 |

(Continued)

OTHER PUBLICATIONS

International Search Report dated Oct. 6, 2020, in PCT/GB2020/051838 (4 pages).
(Continued)

*Primary Examiner* — Abdullah A Riyami
*Assistant Examiner* — Nader J Alhawamdeh
(74) *Attorney, Agent, or Firm* — Bookoff McAndrews, PLLC

(57) ABSTRACT

A negative electrode material for a lithium ion battery, the material comprising: particles comprising a core, with the core containing silicon, the particles having one or more coating layers disposed around the core, at least one of the coating layers comprising a porous semi-conducting metal oxide.

13 Claims, 7 Drawing Sheets

(51) Int. Cl.
*H01M 4/38* (2006.01)
*H01M 4/48* (2010.01)
*H01M 4/587* (2010.01)
*H01M 4/62* (2006.01)
*H01M 10/0525* (2010.01)
*H01M 4/02* (2006.01)

(52) U.S. Cl.
CPC .......... *H01M 4/587* (2013.01); *H01M 4/622* (2013.01); *H01M 4/625* (2013.01); *H01M 10/0525* (2013.01); *C01P 2002/72* (2013.01); *C01P 2004/04* (2013.01); *C01P 2004/64* (2013.01); *C01P 2004/80* (2013.01); *C01P 2006/40* (2013.01); *H01M 2004/027* (2013.01)

(58) Field of Classification Search
CPC ....... H01M 10/0525; H01M 2004/027; H01M 4/1395; H01M 4/621; H01M 4/362; C01B 33/02; C01P 2002/72; C01P 2004/04; C01P 2004/64; C01P 2004/80; C01P 2006/40; Y02E 60/10

See application file for complete search history.

(56) References Cited

U.S. PATENT DOCUMENTS

| | | | |
|---|---|---|---|
| 2018/0026262 A1* | 1/2018 | Jeong | H01M 4/366 |
| | | | 429/231.8 |
| 2018/0069231 A1* | 3/2018 | Kim | H01M 4/1395 |
| 2018/0145316 A1* | 5/2018 | Moon | H01M 4/134 |
| 2019/0207221 A1* | 7/2019 | Son | H01M 4/362 |
| 2019/0214640 A1* | 7/2019 | Salem | H01M 4/134 |
| 2019/0233294 A1* | 8/2019 | Moon | H01M 4/366 |
| 2022/0336794 A1* | 10/2022 | Chao | H01M 4/622 |
| 2024/0030452 A1* | 1/2024 | Son | H01M 4/386 |
| 2024/0038963 A1* | 2/2024 | Oh | H01M 4/131 |

FOREIGN PATENT DOCUMENTS

| | | |
|---|---|---|
| CN | 106099062 A | 11/2016 |
| CN | 106784714 A | 5/2017 |
| CN | 106784763 A | 5/2017 |
| CN | 110048114 A | 7/2019 |
| KR | 10-2012-0089512 A | 8/2012 |

OTHER PUBLICATIONS

Luo, W. et al., "Silicon/Mesoporous Carbon/Crystalline TiO2 Nanoparticles for Highly Stable Lithium Storage," ACS Nano, vol. 10, pp. 10524-10532 (2016).

* cited by examiner

NEGATIVE ELECTRODE MATERIAL FOR A LITHIUM ION BATTERY

CROSS-REFERENCE TO RELATED APPLICATIONS

This application is the national stage entry of International Application No. PCT/GB2020/051838, filed on Jul. 31, 2020, which claims the benefit of priority to GB 1911174.9, filed Aug. 5, 2019.

FIELD OF THE INVENTION

The present invention relates to a negative electrode material for a lithium ion battery, electrodes comprising this material, and lithium batteries containing the electrode comprising the material.

BACKGROUND

Lithium ion batteries are constantly being developed. They generally comprise a positive electrode, which comprises a material containing mobile lithium ions and a negative electrode, to which the lithium ions can flow and be retained, until the current flow is reversed. The materials for negative electrodes have to be able to intercalate lithium and ideally do not show much volume expansion in doing so. Carbon-based materials have been most commercially successful to date, since they can intercalate lithium, with very low volume expansion, are electrically conducting and abundant, and has low voltage, leading to relatively high energy density. Various other materials have been investigated, such as lithium titanate, tin/cobalt alloys and silicon nanowires. Silicon looked initially promising as a material for the negative electrode, as it can store more lithium ions than carbon. However, silicon suffers from significant volume expansion, typically leading to failure of the material, and the battery itself.

There is a desire to create improved lithium ion batteries, and battery materials, which may be an alternative to, ideally an improvement upon, those in the prior art.

SUMMARY

The present disclosure relates to, in a first aspect, a negative electrode material for a lithium ion battery, the material comprising:
  particles comprising a core, with the core containing silicon, the particles having one or more coating layers disposed around the core, at least one of the coating layers comprising a porous semi-conducting metal oxide.

The present disclosure relates to, in a second aspect, a negative electrode for a lithium ion battery, the electrode comprising
  a substrate comprising an electrically conductive material, the substrate having coated on a surface thereof a material comprising particles,
  the particles comprising a core, with the core containing silicon, the particles having one or more coating layers disposed around the core, at least one of the coating layers comprising a porous semi-conducting metal oxide.

The present disclosure relates to, in a third aspect, a lithium ion battery, the lithium ion battery, comprising:
  a positive electrode comprising a material containing lithium ions;
  a negative electrode comprising:
    a substrate comprising an electrically conductive material, the substrate having coated on a surface thereof a material comprising particles, the particles comprising a core, with the core containing silicon, the particles having one or more coating layers disposed around the core, at least one of the coating layers comprising a porous semi-conducting metal oxide.

The present disclosure relates to, in a fourth aspect, a method for preparing a negative electrode material for a lithium ion battery, the method comprising:
  providing particles of silicon;
  coating one or more layers on the particles of silicon, at least one of the layers comprising a porous metal oxide.

The present inventors found that coating silicon particles with a porous semi-conducting metal oxide, e.g. $TiO_2$, was able to allow the silicon to perform very well in a negative electrode, being able to charge and discharge through a number of cycles, show a very high specific capacity, while not showing much, if any, deterioration in the silicon itself.

The performance was enhanced with a carbon-containing layer between the silicon and the porous metal oxide.

DETAILED DESCRIPTION

Figure 1:
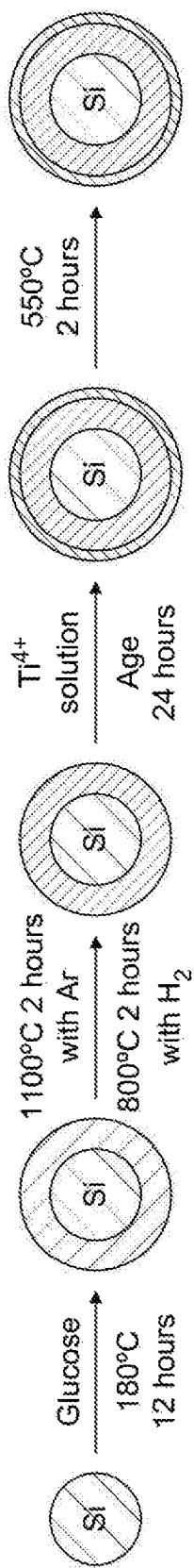
FIG. 1 illustrates an example of a method of synthesising an embodiment of particles for use in or as a negative electrode materials for a lithium ion battery. In this Example, silicon particles are coated with hard carbon and then with titanium dioxide (the particles may be referred to as Si@HC@TiO2 particles). More details are given in the Examples below.

The present disclosure provides the aspects described herein. Optional and preferable features of the aspects are given below. These optional and preferable features are, unless indicated otherwise applicable to all aspects. Any optional or preferred feature may be combined with any other optional or preferred feature.

Herein is provided a negative electrode material for a lithium ion battery, the material comprising:
  particles comprising a core, with the core containing silicon, the particles having one or more coating layers disposed around the core, at least one of the coating layers comprising a porous semi-conducting metal oxide.

"Silicon", in the core of the material, indicates silicon in elemental form. Silicon may be in particulate form, and optionally at least some of the particles may be nanoparticles of silicon. A nanoparticle may be defined as a particle having a diameter, as measured using SEM, of less than 1 µm. At least some of the nanoparticles of silicon may be particles having diameters, as measured using SEM, of from 1 nm to 500 nm, optionally, 1 nm to 200 nm, optionally, 1 nm to 150 nm, optionally 1 nm to 100 nm, optionally, 10 nm to 150 nm, optionally 10 nm to 100 nm. Preferably at least some, optionally at least 90% by number, of the nanoparticles of silicon are less than 150 nm. 90% by number indicates that 90% of the number of particles have a diameter, e.g. as measured using SEM on a sample of at least 100 particles, have a diameter of the stated amount (or less). Silicon, e.g. in particulate form, may be obtained commercially, e.g. from Thermo Fisher. Optionally, the core of each particle comprises one or more silicon nanoparticles.

"Particles of a certain material" may be particles comprising, consisting essentially of or consisting of that certain material. Consisting essentially of may indicate at least 90 wt % of the material of particles are of that certain material.

The porous semi-conducting metal oxide may be selected from a transition metal oxide and a lanthanide metal oxide. Optionally, the metal of the metal oxide is selected from titanium, iron, niobium, tantalum, zirconium, tungsten, cobalt, nickel, copper, manganese and cerium. The metal oxide may be selected from $TiO_2$, $Nb_5O_5$, $Ta_2O_5$, ZnO, $SnO_2$ and $WO_3$. Optionally, the metal oxide comprises, consists essentially of or consists of titanium dioxide. The porous semi-conducting metal oxide may be formable as described below.

In an embodiment, the core has thereon a first coating comprising carbon, and a second coating on the first coating, with the second coating comprising a layer comprising the porous semi-conducting metal oxide.

In an embodiment, the core has thereon a first coating comprising carbon, and a second coating on the first coating, with the second coating comprising titanium dioxide. The carbon in the first coating may be in the form selected from graphite, carbon black, graphene and hard carbon. The first coating may be formable as described below.

In an embodiment, the first coating comprises hard carbon. Hard carbon may be considered to be a non-graphitizing carbon. The hard carbon may have been made from the pyrolysis of a hydrocarbon material in the absence of oxygen. The hydrocarbon material may be selected from petroleum pitch, cellulose, a polysaccharide, a phenolic resin. The hydrocarbon material may be coated onto silicon particles, and then the hydrocarbon-coated silicon particles subjected to a pyrolysing atmosphere, e.g. a temperature of at least 900° C., optionally from 900° C. to 1500° C., in the substantial absence of oxygen, such that the hydrocarbon is pyrolysed and hard carbon is formed. Having a first layer comprising carbon, particularly hard carbon, has been found to improve performance of the negative electrode material compared to such a material lacking the first layer (and in which the porous semi-conducting metal oxide is coated directly onto silicon particles).

At least some of the particles, e.g. at least 90% by number of the particles, having one or more coating layers disposed around the core may have a diameter, as measured using SEM and including the coating layer(s), of from 10 nm to 500 nm, optionally from 50 nm to 400 nm, optionally from 50 to 200 nm.

The negative electrode material may further comprises a binder and/or electrically conductive material. The binder may comprise a polymeric material, which may be selected from a fluorinated polymeric material, a gelling polymeric material and a rubber. The binder may comprise polyvinylidene fluoride (PVDF), polytetrafluoroethylene (PTFE), sodium carboxymethylcellulose (CMC), acrylonitrile-butadiene rubber, styrene-butadiene rubber (SBR) and methyl methacrylate rubber.

The electrically conductive material may comprise particles comprising a metal (in elemental or alloyed form) or carbon (which, if the particles comprising silicon also comprise a coating comprising carbon, are different from the particles comprising silicon). The particles comprising carbon (carbon particles) may comprise carbon in the form of graphite, carbon black, pyrolyzed carbon, coke, activated carbon, carbon fiber, a fullerene, petroleum coke, hard carbon, and carbon nanotubes. The electrically conductive material may comprise particles comprising a metal in elemental or alloyed form; the metal may be selected from a transition metal. The electrically conductive material, which may be in particulate form, may comprise a metal, in elemental or alloyed form, selected from Ni, Ti, Al, Cu, Pt, Fe, Cr, Sn, Zn, In, and Sb.

The particles comprising the core comprising silicon may constitute, including any layers thereon, at least about 50 wt % of the negative electrode material, optionally at least 60 wt %, optionally at least 70 wt %, optionally at least 75 wt %, optionally with the remaining wt % of the negative electrode material being binder and/or electrically conductive material (different from the particles comprising the core comprising silicon).

Also provided herein is a negative electrode for a lithium ion battery, the electrode comprising
  a substrate comprising an electrically conductive material, the substrate having coated on a surface thereof a material comprising particles,
  the particles comprising a core, with the core containing silicon, the particles having one or more coating layers disposed around the core, at least one of the coating layers comprising a porous semi-conducting metal oxide.

The electrically conductive material of the substrate may be selected from a metal in elemental or alloyed form and carbon; the metal may be selected from a transition metal, optionally the metal is selected from aluminum, nickel, iron, which may be in pure or alloyed form such as, stainless steel, titanium and copper. The substrate may be termed a current collector. The substrate may have a thickness of from 1 to 100 µm.

Herein is also provided a lithium ion battery, the lithium ion battery, comprising:
  a positive electrode comprising a material containing lithium ions;
  a negative electrode comprising:
  a substrate comprising an electrically conductive material, the substrate having coated on a surface thereof a negative electrode material as described herein, e.g.
  a material comprising particles, the particles comprising a core, with the core containing silicon, the particles having one or more coating layers disposed around the core, at least one of the coating layers comprising a porous semi-conducting metal oxide.

The positive electrode comprises a material containing lithium ions. The positive electrode material may comprise a lithium-containing substance selected from $LiFePO_4$, $Li_3V_2(PO_4)_3$, $LiMn_2O_4$, $LiMnO_2$, $LiNiO_2$, $LiCoO_2$, $LiVPO_4F$ or $LiFeO_2$; or the ternary system $Li_{1+a}M_bN_cO_2$, in which $-0.1<a\leq0.2$, $0\leq b\leq 1$, $0\leq c\leq 1$, $0<b+c<1.0$, and L, M, N are one or more selected from the group consisted of Co, Mn, Ni, Al, Mg, Ga, Sc, Ti, V, Cr, Fe, Cu and Zn. The positive electrode may comprise a material selected from lithium nickel manganese cobalt oxide, lithium nickel cobalt aluminium oxide and lithium manganese oxide. The positive electrode material may further comprise a binder and/or electrically conductive material (which may be the same as the binder and/or electrically conductive material for the negative electrode).

A separator may be disposed between the positive and negative electrodes. The separator may be electrically insulating and have capacity to hold a liquid, e.g. a non-aqueous electrolyte. The separator may comprise a porous, non-electrically conductive material. The separator may, for example, be a separator selected from a polyolefin (e.g. polyethylene or polypropylene) microporous membrane, a non-woven fabric, e.g. a polyethylene felt and glass fiber felt, superfine glass fiber paper and a porous plate.

A non-aqueous electrolyte may also be disposed between the positive and negative electrodes. The non-aqueous electrolyte may be a solution formed by a lithium salt electrolyte in non-aqueous solvent. The lithium salt electrolyte can be selected from one or more selected from the group consisted of lithium hexafluorophosphate ($LiPF_6$), lithium perchlorate ($LiClO_4$), lithium tetrafluoroborate ($LiBF_4$), lithium hexafluoroarsenate ($LiAsF_6$), lithium hexafluoro silicate ($LiSiF_6$), lithium tetraphenylborate ($LiB(C_6H_5)_4$), lithium chloride (LiCl), lithium bromide (LiBr), lithium chloroaluminate ($LiAlCl_4$), lithium triflate ($LiCF_3SO_3$), Lithium nickel manganese cobalt oxide, lithium nickel cobalt aluminium oxide ($LiNiCoAlO_2$), lithium manganese oxide ($LiMn_2O_4$) lithium iron phosphate ($LiFePO_4$), lithium cobalt oxide ($LiCoO_2$) and $Li(C_2F_5SO_2)_2N$; the non-aqueous solvent can be selected from ethers, esters, alkyl carbonates, inorganic solvents, and suitable organic solvents. The ether may be selected from polyethers, such as polyethylene oxides, cyclic ethers such as tetrahydrofuran and cyclic acetals such as 1-3 dioxolane. The esters may be selected from methyl formate, ethyl acetate, γ-butyrolactone (γ-BL), and rolactone. The alkyl carbonates may be selected from ethylene carbonate (EC), propylene carbonate (PC), butylene carbonate (BC), dimethyl carbonate (DMC), diethyl carbonate (DEC), ethyl methyl carbonate (EMC), methyl propyl carbonate (MPC), dipropyl carbonate (DPC), and vinylene carbonate (VC). The inorganic solvents may be selected from $SO_2$, $Cl_2SO$, $SO_2Cl_2$. Suitable organic solvents may be selected from acetonitrile, nitromethane, N,N-dimethyl formamide, dimethyl sulphoxide, sulfolane and methyl chloride. In the non-aqueous electrolyte, the concentration of the lithium salt electrolyte can be 0.1-2 mol/L, preferably 0.8-1.2 mol/L.

The battery may be a re-chargeable or secondary battery. The battery may be charged by any suitable means, including, but not limited to, solar power, other battery or cells (not necessarily a lithium ion battery), or mains electricity. Once charged, the battery may be discharged as desired.

The battery may be of any suitable configuration; in an embodiment, the battery is in a configuration selected from a button cell, coin cell, pouch cell, prismatic cell, flat cell, cylindrical cell, thin film cell, sealed cell, and a wound cell.

Here is also disclosed a method for preparing a negative electrode material for a lithium ion battery, the method comprising:

providing particles of silicon;

coating one or more layers on the particles of silicon, at least one of the layers comprising a porous semi-conducting metal oxide. The porous semi-conducting metal oxide may be as described herein.

At least some of the particles of silicon may be nanoparticles of silicon. A nanoparticle may be defined as a particle having a diameter, as measured using SEM, of less than 1 μm. At least some of the nanoparticles of silicon, e.g. at least 90% by number, may be particles having diameters, as measured using SEM, of from 1 nm to 500 nm, optionally, 1 nm to 200 nm, optionally 1 nm to 100 nm, optionally 10 nm to 100 nm, optionally from 20 nm to 100 nm. Silicon, e.g. in particulate form, may be obtained commercially, e.g. from Thermo Fisher. Optionally, the core of each particle comprises one or more silicon nanoparticles.

The method comprising coating a first layer comprising carbon on the particles of silicon, and coating a second layer on the first layer, the second layer comprising a porous semi-conducting metal oxide. The carbon in the first layer may be in the form of graphite, graphene, carbon black, and hard carbon.

In an embodiment, the first coating comprises hard carbon. The method may involve forming a layer comprising a hydrocarbon on the particles of silicon and pyrolysing this layer, in the substantial absence of oxygen, to form a layer comprising hard carbon. The hydrocarbon material may be selected from petroleum pitch, cellulose, a polysaccharide, a phenolic resin. The hydrocarbon material may be coated onto the silicon particles, and then the hydrocarbon-coated silicon particles subjected to a pyrolysing atmosphere, e.g. a temperature of at least 900° C., optionally from 900° C. to 1500° C., in the substantial absence of oxygen, such that the hydrocarbon is pyrolysed and hard carbon is formed.

The layer of porous metal oxide may be formed either directly on the silicon particles or, if a first layer comprising carbon is present, on the first layer (to form the second layer comprising the porous metal oxide). The layer of porous metal oxide may be made by formation of the metal oxide from precursor compound containing the metal. For example, the precursor compound may be a metal alkoxide, which can react with water to form the metal oxide. In an embodiment, the particles of silicon, which may or may not have the first layer comprising carbon thereon, are contacted with the metal alkoxide and water, such that a layer of the metal oxide is formed on the silicon particles, either directly on the silicon or, if present, on the first layer comprising carbon. The particles of silicon, which may or may not have the first layer comprising carbon thereon, may be suspended in the metal alkoxide and water added to the metal oxide or otherwise atmospheric moisture allowed to contact the water, to effect the reaction to form the metal oxide. In an alternative embodiment, the particles of silicon, which may or may not have the first layer comprising carbon thereon, may be suspended in water added to the metal oxide and allowed to contact the metal alkoxide, to effect the reaction to form the metal oxide. The metal alkoxide may be a titanium alkoxide, such as titanium propoxide. The method may further involve, after the contacting of the particles of silicon with the water and the metal alkoxide to form the metal oxide coating, heating the particles at a temperature of from 300° C. to 800° C., optionally from 400° C. to 700° C., e.g. for a period of from 30 minutes to 5 hours, optionally from 1 to 3 hours.

EXAMPLES

Example 1—Coating of Silicon Nanoparticles with Hard Carbon, and then with Titanium Dioxide (Si@HC@TiO$_2$)

Materials:

Glucose, silicon nanoparticles (have a diameter of 60±5 nm, as measured by SEM or TEM, Thermo Fisher), Titanium Isopropoxide, Ethanol, DI water.

Method:

70 g glucose and 0.7 g silicon nanoparticles were mixed and fully dispersed in 70 ml DI water. Since silicon nanoparticles are not soluble in DI water, sonication was used to aid dispersion, with the result being a brown suspension. The suspension was transferred into a Teflon cell, which, in turn, was put into an autoclave. The autoclave was put into an oven and heated at 180° C. for 12 hours. The product was centrifuged 3 times after heating and the product then dried at 120° C. with 50 mbar in vacuum oven for 4 hours to make sure it was completely dried. This was then heated at 10° C./min heating rate to 1100° C. and kept at that temperature for 2 hours. This heated material was protected by Ar flow. To further reduce the functional group on surface, the product was kept at 800° C. for 2 hours under the protection of H$_2$ flow. This produced silicon nanoparticles coated with hard carbon (HC); these particles may be referred to as Si@HC particles. After addition of titanium isopropoxide, the suspension was first sonicated to make sure the Si@HC particles are fully dispersed and then the mixture is aged for 24 hours. The aged suspension was then centrifuged three times. The mass was dried in the oven at 40° C. for 4 hours. The solids were then heated in the furnace at 5° C./min heating rate until a temperature of 550° C. is reached and then it is kept at that temperature for 2 hours. The final product was a brown and white solid. A schematic reaction scheme is shown in FIG. 1.

TiO$_2$ was found to have excellent chemical stability, relatively high ionic conductivity and low volume expansion during charge/discharge cycles.

Example 2—Characterisation of Si@HC@TiO$_2$ Particles

XPS (X-Ray Photoelectron Spectroscopy)

Figure 2:
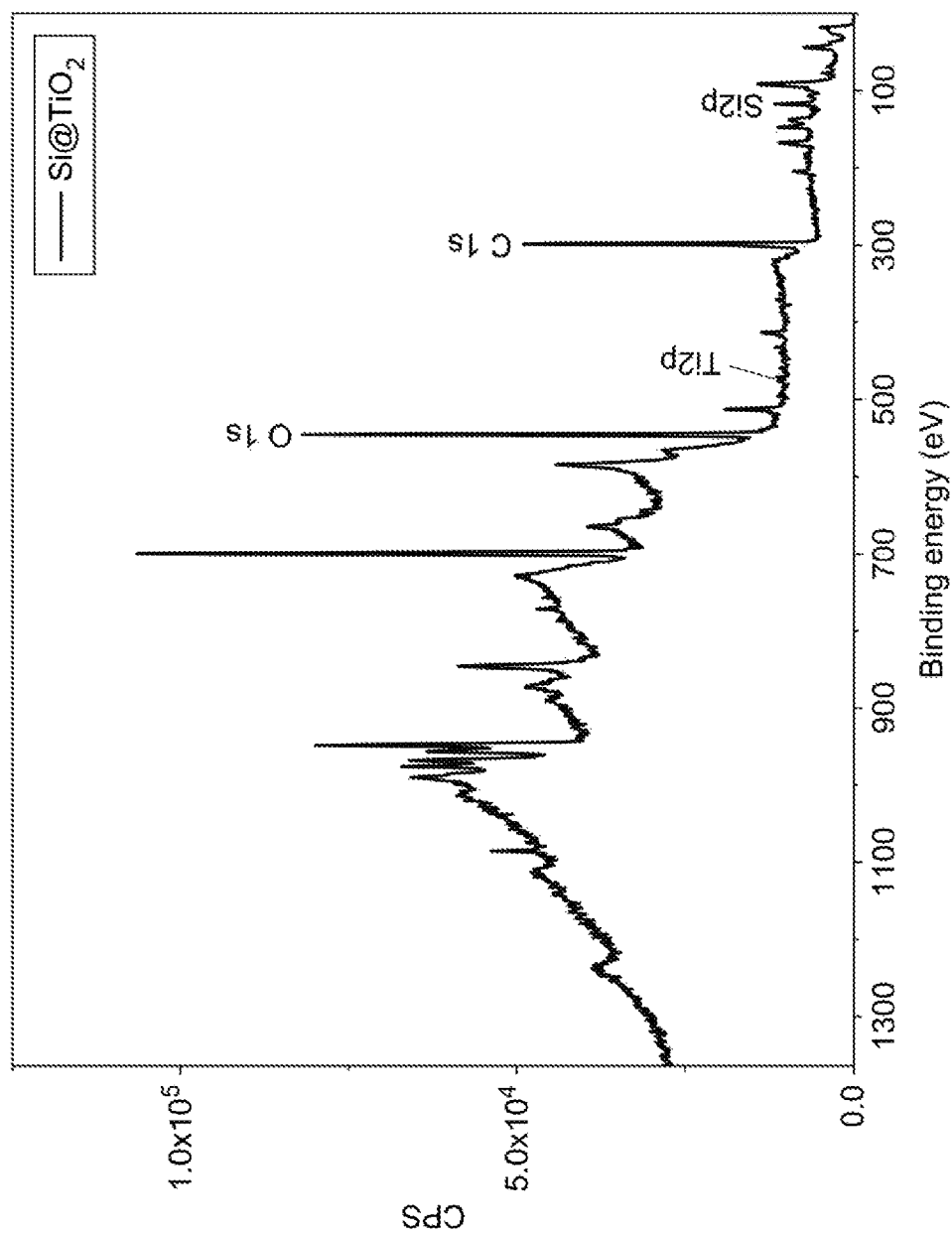
FIG. 2 is an XPS spectrum of the Si@HC@TiO2 particles produced in FIG. 1 and described in the Examples below.

The XPS spectrum is shown in FIG. 2. The peaks of Si, Ti, C and O can be seen from XPS. The TiO$_2$ shell is quite thick outside the silicon nanoparticles, which would cover the signal from silicon nanoparticles because XPS is a technique to detect the surface of the materials.

XRD (X-Ray Power Diffraction)

Figure 3:
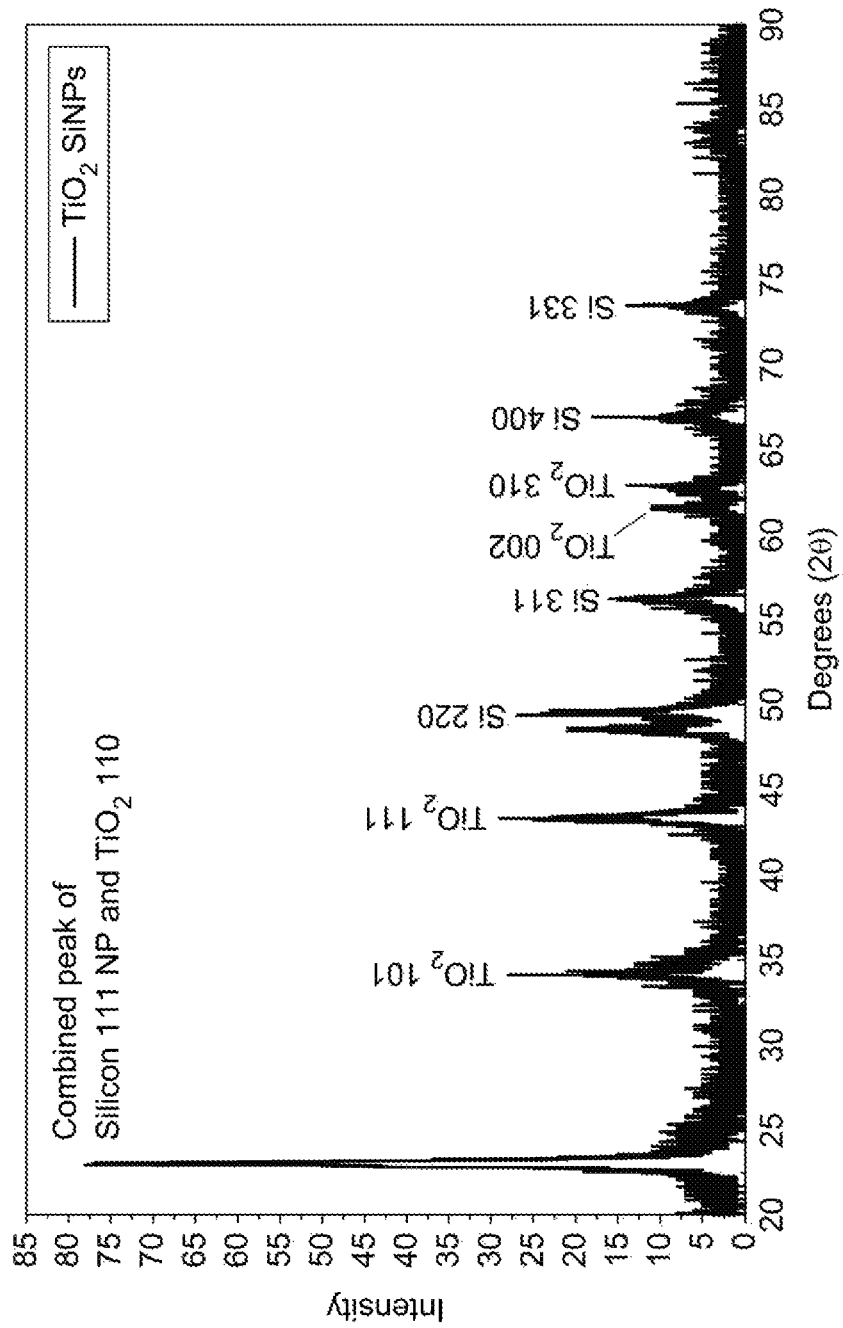
FIG. 3 is an XRD spectrum of the Si@HC@TiO2 particles produced in FIG. 1 and described in the Examples below.

The XRD spectrum shown in FIG. 3, is consistent with the observation using XPS, that all TiO$_2$ features are visible. Silicon 111 NP, Si 220 and Si 400 are presented in FIG. 2, which could prove the silicon nanoparticles are coated by TiO$_2$.

STEM (Scanning Tunnelling Electron Microscope)

Figure 4:
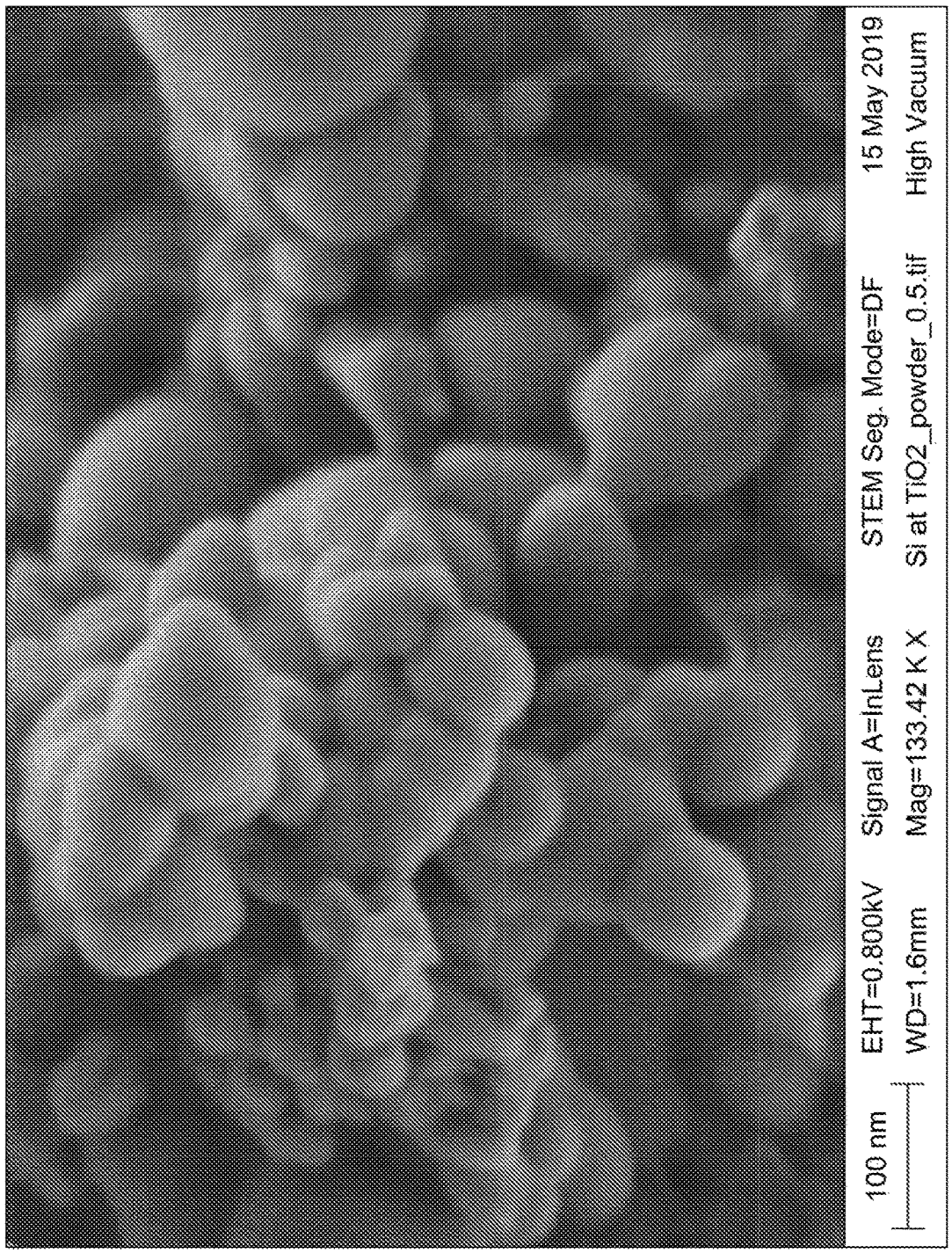
FIG. 4 is a STEM micrograph of the Si@HC@TiO2 particles produced in FIG. 1 and described in the Examples below.
Figure 5:
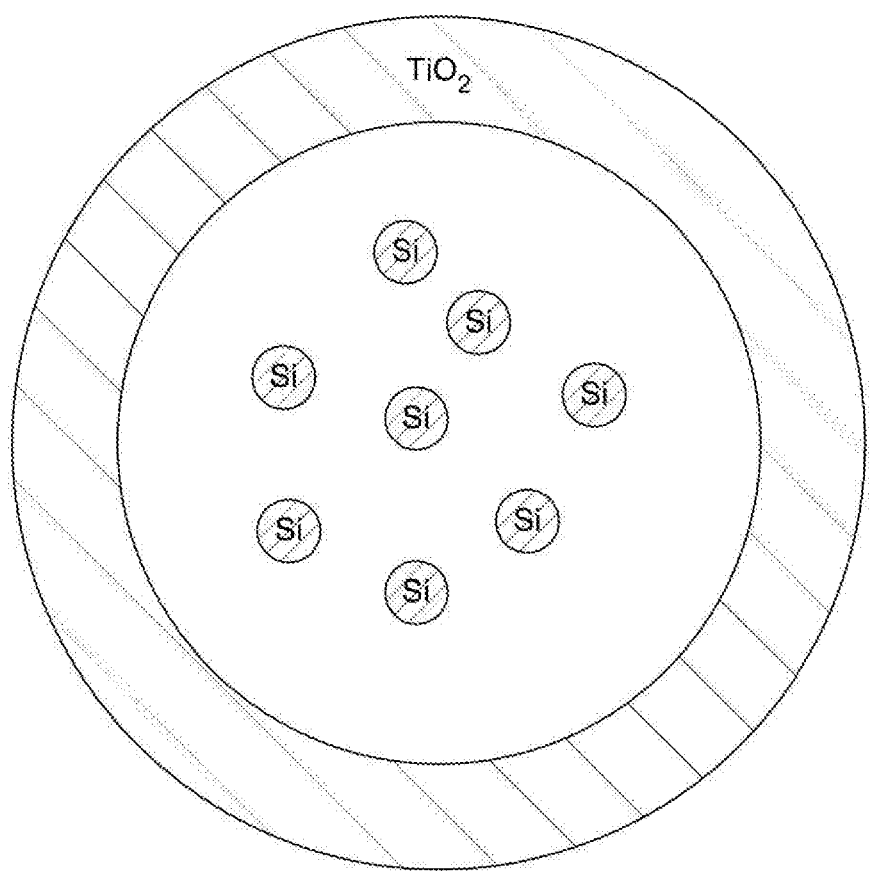
FIG. 5 is a schematic diagram of the structure of Si@HC@TiO2 particles that contain a plurality of silicon nanoparticles in the core.

STEM was used to determine the size and shape of the Si@HC@TiO2 particles. The micrograph of the Si@HC@TiO2 particles from the STEM is shown in FIG. 4. From the size and shape of the particles, the present inventors consider that the TiO$_2$ shell could coat multiple silicon nanoparticles together, as shown schematically in FIG. 5.

Example 3—Creating a Battery Using the Si@HC@TiO2 Particles

Figure 6:
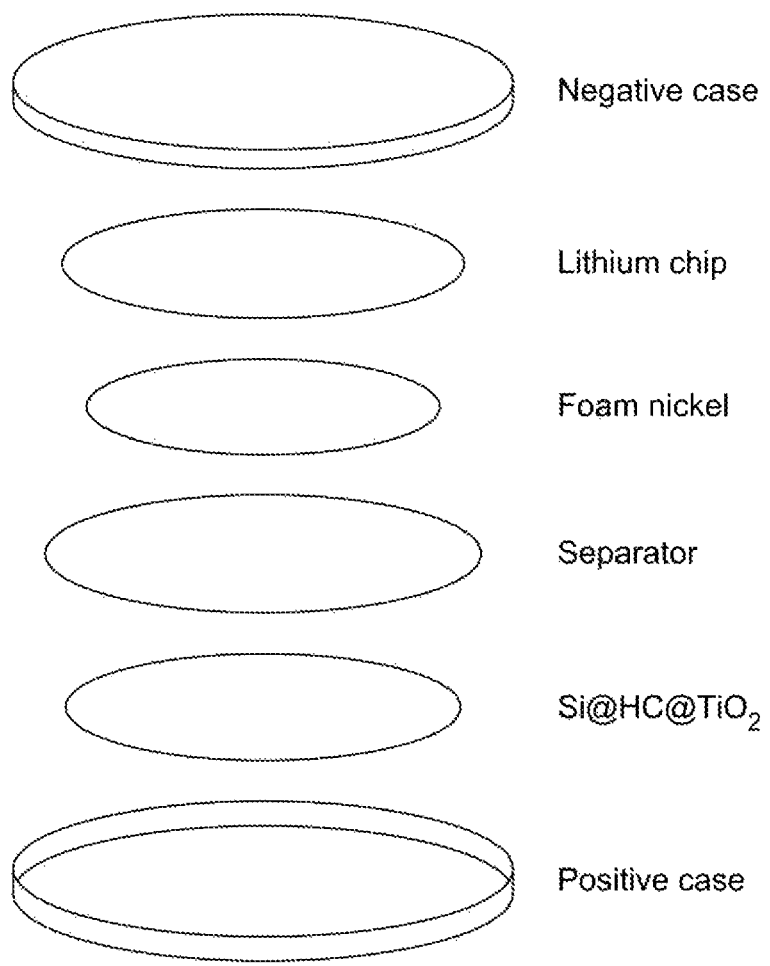
FIG. 6 is a schematic diagram of a coin cell assembly containing the Si@HC@TiO2 particles produced in the Examples.

FIG. 6 shows schematically the coin cell battery created containing the Si@HC@TiO2 particles.

The anode (negative electrode) was prepared by mixing the Si@HC@TiO2 particles, carbon (carbon black) and binder (CMC-Na, Sigma-Aldrich Co.) in deionized water at a weight ratio of 8:1:1, then the mixture was cast uniformly onto copper foil and dried in a vacuum oven at 80° C. The positive case, anode, separator, foam nickel, lithium metal cathode, and negative case should be assembled in a glove box, such that it has the construction shown schematically in FIG. 6. In more detail, the separator and the lithium metal cathode together with the prepared anode were assembled in a coin-type cell (CR2016) within an argon-filled glove box with electrolyte composed of 1M LiPF$_6$ in a mixture of ethylenecarbonate/dimethyl-carbonate/ethyl-methyl-carbonate (1:1:1, volume ratio). The mass loading of the anode film was approximately 10.0 mg cm$^{-2}$.

Example 4—Testing the Battery

Figure 7:
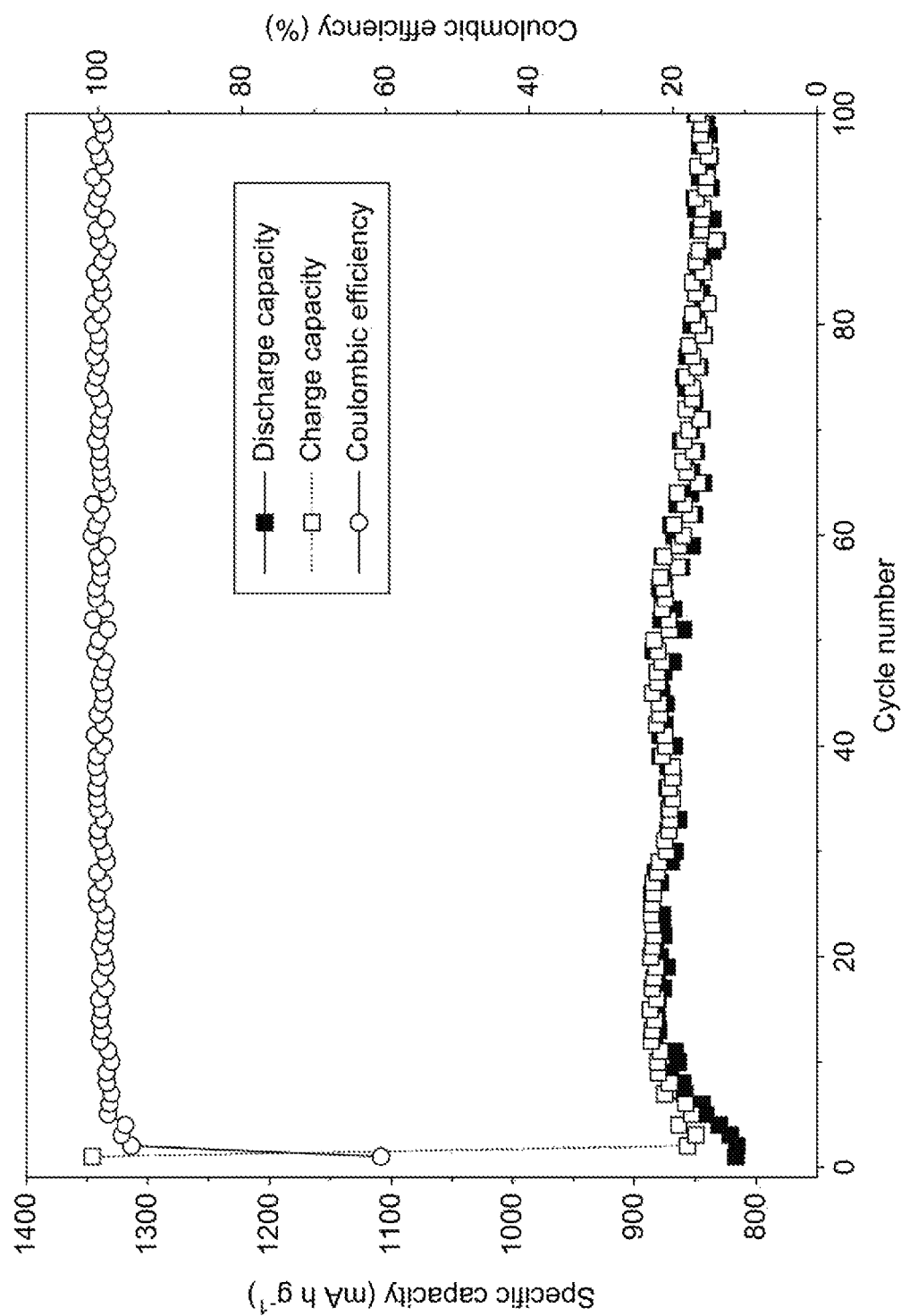
FIG. 7 shows the cycling performance of the electrode at a current density of 100 mA $g^{-1}$ and a voltage range of 0.01-3.0 V (100th).

The cycling performances of the electrode were obtained at a current density of 100 mA g$^{-1}$ and a voltage range of 0.01-3.0 V (100th). The results are shown in FIG. 7.

Although the specific capacity is still lower than the theoretical value of 4200 mAh g$^{-1}$, the value is approaching 1000 mAh g$^{-1}$, which is almost three times of the specific capacity of carbon.

The invention claimed is:

1. A negative electrode material for a lithium ion battery, the material comprising:
   particles comprising a core, with the core containing silicon, the particles having one or more coating layers including a first coating and a second coating disposed around the core, wherein the first coating comprises hard carbon and the second coating comprises a porous semi-conducting metal oxide.

2. The negative electrode material according to claim 1, wherein the porous semi-conducting metal oxide is selected from a transition metal oxide and a lanthanide metal oxide.

3. The negative electrode material according to claim 1, wherein the metal of the metal oxide is selected from titanium, iron, niobium, tantalum, zirconium, tungsten, cobalt, nickel, copper, manganese and cerium.

4. The negative electrode material of claim 1, wherein the second coating comprises titanium dioxide.

5. The negative electrode material according to claim 1, wherein the core of each particle comprises one or more silicon nanoparticles.

6. The negative electrode material of claim 1, wherein the material further comprises a binder and/or electrically conductive material.

7. The negative electrode material of claim 6, wherein the binder comprises a polymeric material, optionally a gelling polymeric material.

8. The negative electrode material of claim 6, wherein the electrically conductive material comprises carbon particles.

9. A negative electrode for a lithium ion battery, the electrode comprising
   a substrate comprising an electrically conductive material, the substrate having coated on a surface thereof a material comprising particles,
   the particles comprising a core, with the core containing silicon, the particles having one or more coating layers including a first coating and a second coating disposed around the core, wherein the first coating comprises hard carbon and the second coating comprises a porous semi-conducting metal oxide.

10. A lithium ion battery, the lithium ion battery comprising:
   a positive electrode comprising a material containing lithium ions;
   the negative electrode according to claim 9.

11. The negative electrode according to claim 9, wherein the porous semi-conducting metal oxide is selected from a transition metal oxide and a lanthanide metal oxide.

12. The lithium ion battery according to claim 10, wherein the porous semi-conducting metal oxide is selected from a transition metal oxide and a lanthanide metal oxide.

13. A method for preparing a negative electrode material for a lithium ion battery, the method comprising:
   providing particles of silicon;
   coating a first coating and a second coating on the particles of silicon, wherein the first coating comprises hard carbon and the second coating comprises a porous semi-conducting metal oxide.

\* \* \* \* \*